US010455005B2

(12) United States Patent
Deen et al.

(10) Patent No.: US 10,455,005 B2
(45) Date of Patent: *Oct. 22, 2019

(54) DETECTING VIRTUAL PRIVATE NETWORK USAGE

(71) Applicant: Comcast Cable Communications, LLC, Philadelphia, PA (US)

(72) Inventors: Robert Glenn Deen, Simi Valley, CA (US); Antony Tauber, Cambridge, MA (US)

(73) Assignees: Comcast Cable Communications. LLC, Philadelphia, PA (US); NBCUniversal Media, LLC, New York, NY (US)

( * ) Notice: Subject to any disclaimer, the term of this patent is extended or adjusted under 35 U.S.C. 154(b) by 196 days.

This patent is subject to a terminal disclaimer.

(21) Appl. No.: 15/718,663

(22) Filed: Sep. 28, 2017

(65) Prior Publication Data

US 2018/0063228 A1   Mar. 1, 2018

Related U.S. Application Data

(63) Continuation of application No. 14/314,880, filed on Jun. 25, 2014, now Pat. No. 9,813,488.

(51) Int. Cl.
*H04L 29/08* (2006.01)
*H04L 12/26* (2006.01)

(52) U.S. Cl.
CPC .......... *H04L 67/10* (2013.01); *H04L 43/0876* (2013.01); *H04L 67/02* (2013.01); *H04L 67/18* (2013.01); *H04L 67/28* (2013.01)

(58) Field of Classification Search
CPC ..... H04L 43/0876; H04L 67/02; H04L 67/10; H04L 67/18; H04L 67/28

(Continued)

(56) References Cited

U.S. PATENT DOCUMENTS

| 7,016,964 B1 * | 3/2006 | Still | H04L 63/0281 709/203 |
| 8,149,722 B2 * | 4/2012 | Mera | H04L 12/4633 370/248 |
| 2009/0077223 A1 * | 3/2009 | Bachiri | G06F 16/958 709/224 |

OTHER PUBLICATIONS

Understanding TCP/IP addressing and subnetting basics. http://support.microsoft.com/kb/164015—accessed Apr. 22 <http://support.microsoft.com/kb/164015%20-%20accessed%20April%2022>, 2014, 6 pages, accessed Apr. 22, 2014.

(Continued)

*Primary Examiner* — Michael C Lai
(74) *Attorney, Agent, or Firm* — Banner & Witcoff, Ltd.

(57) ABSTRACT

According to some aspects described herein, a system may determine whether a network actor appears to be using an intermediary such as a VPN and/or proxy server. This may be accomplished by directing the network actor to request and/or access a network-segment identification resource which may, in some embodiments, be stored in another region of the global network. The system may include links and/or other identifiers pointing the network actor to one or more network-segment identification resources. The network actor may access the network-segment identification resources using the links or identifiers, and the system may use information about the request for the network-segment identification resource to determine whether the network actor is associated with multiple source addresses.

25 Claims, 8 Drawing Sheets

(58) Field of Classification Search
USPC .......................................................... 709/224
See application file for complete search history.

(56) References Cited

OTHER PUBLICATIONS

Anonymous Proxy Detection and Control: Enhance Network Security by Exposing Anonymous Proxy Traffic, Exinda. <http://www.etruserve.com.tw/exinda/data/wp_Exinda_Anonymous%20Proxy%20Detection%20and%20Control.pdf>, accessed Mar. 20, 2014, 9 pages.
Detecting and Preventing Anonymous Proxy Usage, SANS Institute InfoSec Reading Room. <http://www.sans.org/reading-room/whitepapers/detection/detecting-preventing-anonymous-proxy-usage-32943>, accessed Mar. 20, 2014, 49 pages.
Split tunneling, Wikipedia, <http://en.wikipedia.org/wiki/Split_tunneling>, accessed Mar. 20, 2014, 2 pages.

* cited by examiner

DETECTING VIRTUAL PRIVATE NETWORK USAGE

CROSS-REFERENCE TO RELATED APPLICATIONS

The present application is a continuation of U.S. patent application Ser. No. 14/314,880, entitled "Detecting Virtual Private Network Usage," filed Jun. 25, 2014, the content of which is hereby incorporated by reference.

BACKGROUND

Users request content from content sources all over the world. For example, a user located in the United States may request to stream a sporting event from a server located in the United Kingdom. Content servers may seek to control access to hosted electronic content based on a location of a requesting user. However, some users may utilize virtual private networks (VPNs) or proxy servers that change an apparent location of a user requesting electronic content. As a result, a content server may base access control determinations on an inaccurate location. These and other shortcomings are addressed by the present disclosure.

SUMMARY

The following summary is for illustrative purposes only, and is not intended to limit or constrain the detailed description.

According to some aspects described herein, a content server or system managing a content server may determine whether a network actor, such as a user and/or a computing device operated by a user, appears to be using an intermediary such as a VPN and/or proxy server. This may be accomplished, in some embodiments, by directing the network actor to request one or more network-segment identification resources stored in other network regions of the global network. The system may provide one or more links and/or other identifiers in a response to an initial request by a user for a content resource provided by the system, pointing the network actor to resources hosted on other servers. The network actor may access the network-segment identification resources using the links or identifiers, and the system may use information associated with the request for and/or subsequent access of the network-segment identification resource to determine whether the network actor is associated with multiple source addresses.

In some embodiments, an identifier and/or link used to include the network-segment identification resource may be associated with the network actor, and the system may utilize the identifier to recognize when that particular network actor accesses the network-segment identification resource. The identifier may be used to distinguish the network actor from other network actors. A source address used to access the network-segment identification resource may be recorded and compared to the source address used in an original request for the resource.

In other embodiments, the system may determine whether the network actor is associated with multiple source addresses based on location- and/or network-segment-specific content returned to the network actor in response to a request for the network-segment identification resource. The system may challenge the network actor by asking the network actor to describe and/or otherwise provide one or more attributes of location specific content returned from a network-segment identification server. Based on known and/or expected regional results, the system may determine a location and/or network segment used to access the network-segment identification resource and compare this location to a location associated with the original request for the content resource (e.g., as received by a content server).

Some embodiments described herein provide a method including generating a response to a first request from a first source address for a content resource. The response may include an identifier of a network-segment identification resource. The method may include detecting a second request from a second source address to the network-segment identification resource. The first source address may be compared to the second source address. For example, it may be determined whether the first source address matches the second source address. Based on the comparison, a network actor associated with the first source address and the second address may be identified as associated with use of an intermediary such as a virtual private network (VPN) or a proxy server.

In some embodiments, the identifier may uniquely identify the first request and/or network actor. The identifier may be generated based on the first source request. The identifier may be generated by hashing the first source address. The identifier may include a parameter that is generated based on the first source address.

In some embodiments, the network-segment identification resource may be located in a different internet protocol (IP) address block and/or network segment from the resource. The IP address blocks may correspond to different geographic (e.g., global and/or regional) locations.

In some embodiments, the network actor may be identified as associated with intermediary use, such as VPN use or proxy server use, when it is determined that the first address (e.g., that of the initial request for content received by the system) does not match the second address (e.g., that of the request for the network-segment identification resource). Information regarding the request for the network-segment identification resource may be requested by a first server associated with the content resource. The first server may query a second server associated with the network-segment identification resource to detect the second request. The second server may notify the first server of the request for the network-segment identification resource.

Responsive to identifying the network actor as associated with intermediary use, such as VPN use or proxy server use, in some embodiments, the network actor (such as a user or a computing device operated by a user) may be blocked from accessing the content resource or related resources. The method may include determining whether to block access by the network actor to the requested content resource or related resources. In some embodiments, other actions may be taken based on identifying the network actor as associated with intermediary use, VPN use, or proxy server use, such as selecting localized content for the content resource, translating the content resource into an appropriate language, and/or otherwise customizing the requested content resource based on the source address used to access the network-segment identification resource.

Some embodiments described herein provide a method that includes generating a response to a first request from a first source address for a content resource. The response may include a pointer to a network-segment identification resource. The method may include receiving location-specific information associated with the network-segment identification resource from the first source address and determining whether the location-specific information matches an expected result based on the first source address. It may then be determined whether the first source address appears to be associated with an intermediary such as a virtual private network (VPN) or proxy server.

In some embodiments, the location-specific information may be based on a second source address used to access the network-segment identification resource. The first source address may be identified as associated with the intermediary such as a VPN or proxy server when it is determined that the location-specific information does not match the expected result. The pointer to the network-segment identification resource may be included in the first response as an image resource. The network-segment identification resource may be located in a different internet protocol (IP) address block from the electronic resource.

In some embodiments, the method may include determining a location based on the location-specific information and selecting content to provide to the first source address based on the determined location. Selecting content based on the determined location may comprise selecting a content language based on the determined location.

Some embodiments described herein provide a method that includes receiving a response to a first request for a content resource from a first source. The response may include an identifier of a network-segment identification resource. The method may include sending a second request for the network-segment identification resource to a second source based on the identifier. The method may further include providing challenge information associated with the network-segment identification resource to the first source. The first source may be located in a different internet protocol (IP) address block and/or network segment from the second source. The IP address blocks may group IP addresses by region or other criteria. In some embodiments, the first request may be transmitted using a first network interface and the second request may be transmitted using a second network interface different from the first network interface.

In some embodiments, a response to a request for an electronic resource may include identifiers of more than one network-segment identification resource. Information regarding requests for the network-segment identification resources may be compared to a request for the content resource. Based on this comparison, the system may determine whether the network actor is using an intermediary, such as a VPN or proxy server, and determine a probable location and/or network segment associated with a real address of the network actor. In some embodiments, the system may detect one or more source addresses used to request the network-segment identification resources. The system may determine a location and/or network segment associated with each one of the source addresses and base a determination regarding intermediary use on the determined locations or network segments. In other embodiments, the system may request location-specific information from a network actor that was retrieved from each one of the network-segment identification resources. The system may determine a location and/or network segment associated with the location-specific information returned for each network-segment identification resource and base a determination regarding intermediary use on the determined locations and/or network segments. Based on the determined locations and/or network segments, a probable real address associated with the network actor may be determined.

In some embodiments, a network segment evaluation function may be used to determine whether the first source address and the second source address indicate intermediary use. The evaluation function may generate a score based on a network distance between the two addresses. The evaluation function may further utilize additional data beyond the address values recorded, such as by assessing a network route path from the first source address and the second source address. Based on a result of the evaluation function, the system may determine whether the network actor appears to be using an intermediary, a VPN, and/or a proxy server.

In some embodiments, records of first and second source address pairs may be stored and/or referenced, and these records may be analyzed to detect patterns and/or trends. The system may determine that a first source address is used in multiple requests, and that the first source address is associated with a plurality of second source addresses. The system may determine that the first source address is associated with more than one network actor and may be a VPN endpoint and/or other intermediary device. Additional criteria may be used to better and/or more accurately determine addresses associated with VPN endpoints, such as waiting until a threshold number of different actors have used a first source address before determining it to be a VPN endpoint.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying drawings in which like numerals indicate similar elements.

DETAILED DESCRIPTION

Figure 1:
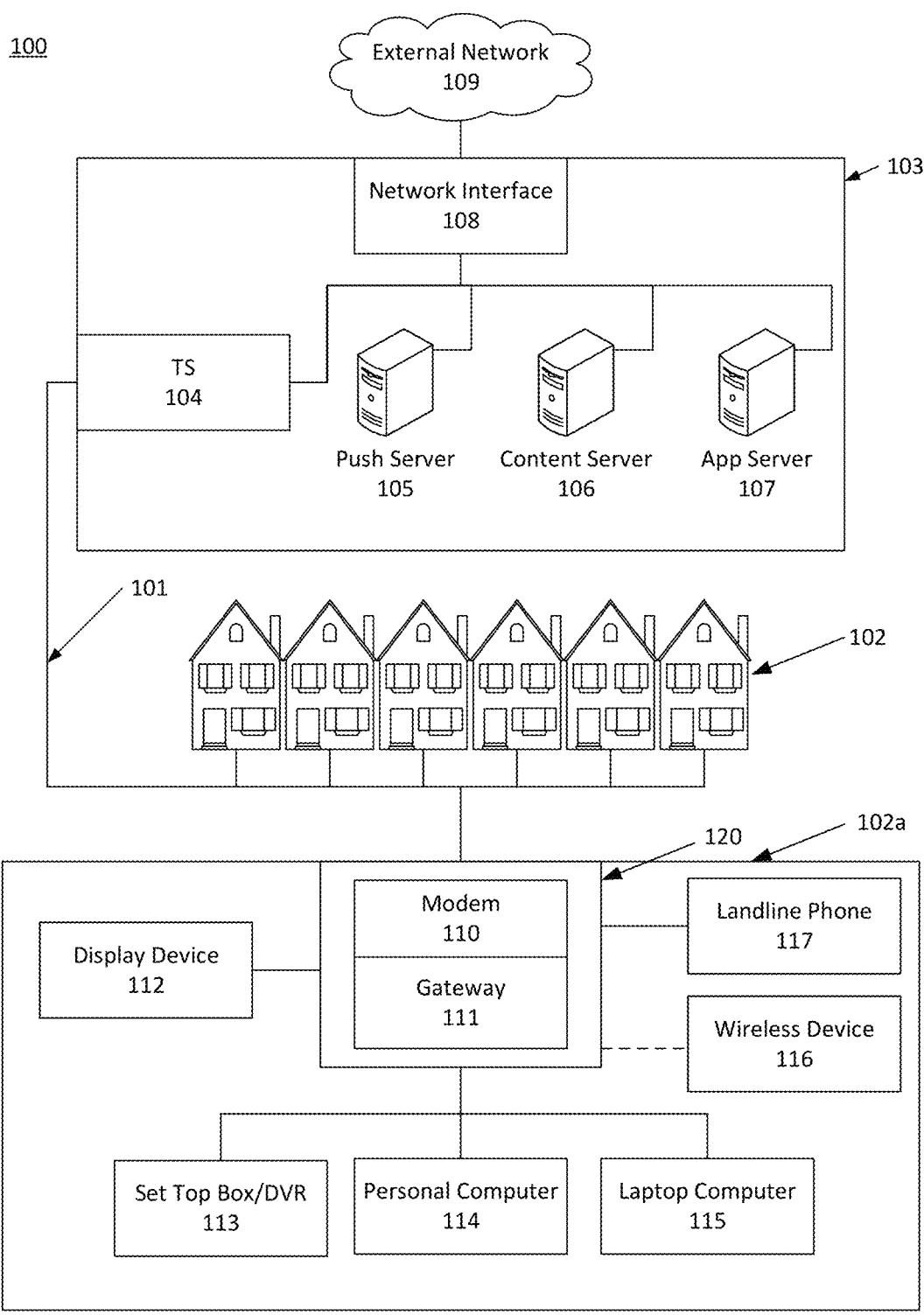
FIG. 1 illustrates an example communication network on which various features described herein may be implemented.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Web content providers manage and serve content such as webpages, data files, audio, video, images, programs, and/or other content resources in response to receiving requests by users over a network such as the Internet. The requests may be received from network actors, such as a computing device executing a web browser operated by a user to view and/or retrieve content, for example. Content providers may seek to identify a user location associated with requests for content and vary their responses based on that location. Such techniques are sometimes referred to as "geoidentification," whereby systems including content servers differentiate between network actors based on their geographic location. A system, such as one including a content server, operated by the content provider may observe a source IP address of a request for a resource, such as an item of content (e.g. webpages, images, audio, video, and the like), and determine a geographic location of the network actor who sent the request. Based on the location of the network actor, a content server may vary its response to the request. For example, the content server may decide to block access by the user based on a location-restricted content license and/or other business rules. As another example, the content server may adapt its response to include localized content, such as by including advertisements relevant to the location of the network actor or translating text into a language associated with the location. Similarly, the system may assess a network segment used by the network actor and a content server may vary its response based on that network segment.

However, some users may utilize intermediaries that may replace or hide network credentials, such as virtual private networks (VPNs) and/or proxy servers, to bypass content restrictions and/or otherwise hide their real IP address as a source of network traffic. Through use of an intermediary such as a VPN or proxy, network traffic generated by the network actor may appear as though it originated from an IP address of the intermediary, rather than the real IP address of the network actor. Some network actors may utilize network configurations including an intermediary such as a VPN or proxy server to, for example, route and/or modify at least a portion of outgoing network traffic such that the traffic appears to originate from the intermediary. The network actor may utilize a virtual network interface to route some or all of its network traffic through the intermediary. Intermediary use may be difficult to detect. For example, VPN use may be very difficult to detect, as network traffic sent through the VPN appears as normal traffic from the VPN endpoint.

Aspects of the present disclosure may be used by a system, such as a system including a content server, to assist in geoidentification techniques by detecting when a network actor appears to be using an intermediary such as a virtual private network (VPN) or proxy server to access the content server. Methods and techniques described further below may detect when network traffic appears to emerge from a VPN endpoint but is originally being generated by a network actor having a real IP address different from that of the VPN. Although the following discussion will primarily describe detecting VPN use, the methods and techniques disclosed herein are equally applicable to detecting the use of any network intermediary or network interface that can be used by a network actor to obscure his or her real IP address and/or geographic location, such as a proxy server. According to some embodiments described herein, for example, a system may identify when a network actor routes one portion of outbound network traffic through an intermediary, such as a VPN or proxy server, where the traffic appears to emerge from an intermediary node but is originally generated by a network actor having a real address different from that of the intermediary.

Some aspects of the disclosure may utilize the fact that some VPNs only route a portion of the Internet traffic from the VPN client over the VPN. A content server may attempt to make a network actor who may be using a VPN (or other intermediary) access network-segment identification resources on the global network that are outside of a regional IP address block and/or network segment associated with the content server. If the network actor is using a VPN, the network actor may use a network interface other than the virtual network interface (and thus a source address other than the VPN endpoint) to access the network-segment identification resource as it may be outside the range of addresses utilizing the VPN. If a different address is used to access the network-segment identification resource from the address used to access the content server, one or both of the addresses may be associated with a VPN endpoint (or other intermediary) and/or the network actor may be using a VPN and/or proxy. The content server may determine whether the network actor appears to be using an intermediary such as a VPN and/or proxy by observing the address used to access the network-segment identification resource or by asking the network actor to retrieve location-specific information from the network-segment identification resource, as further described below.

Various features of the methods and systems for detecting use of an intermediary such as a virtual private network (VPN) discussed above will be further described below. However, first an exemplary operating environment as shown in FIGS. 1 and 2 will be described.

Figure 2:
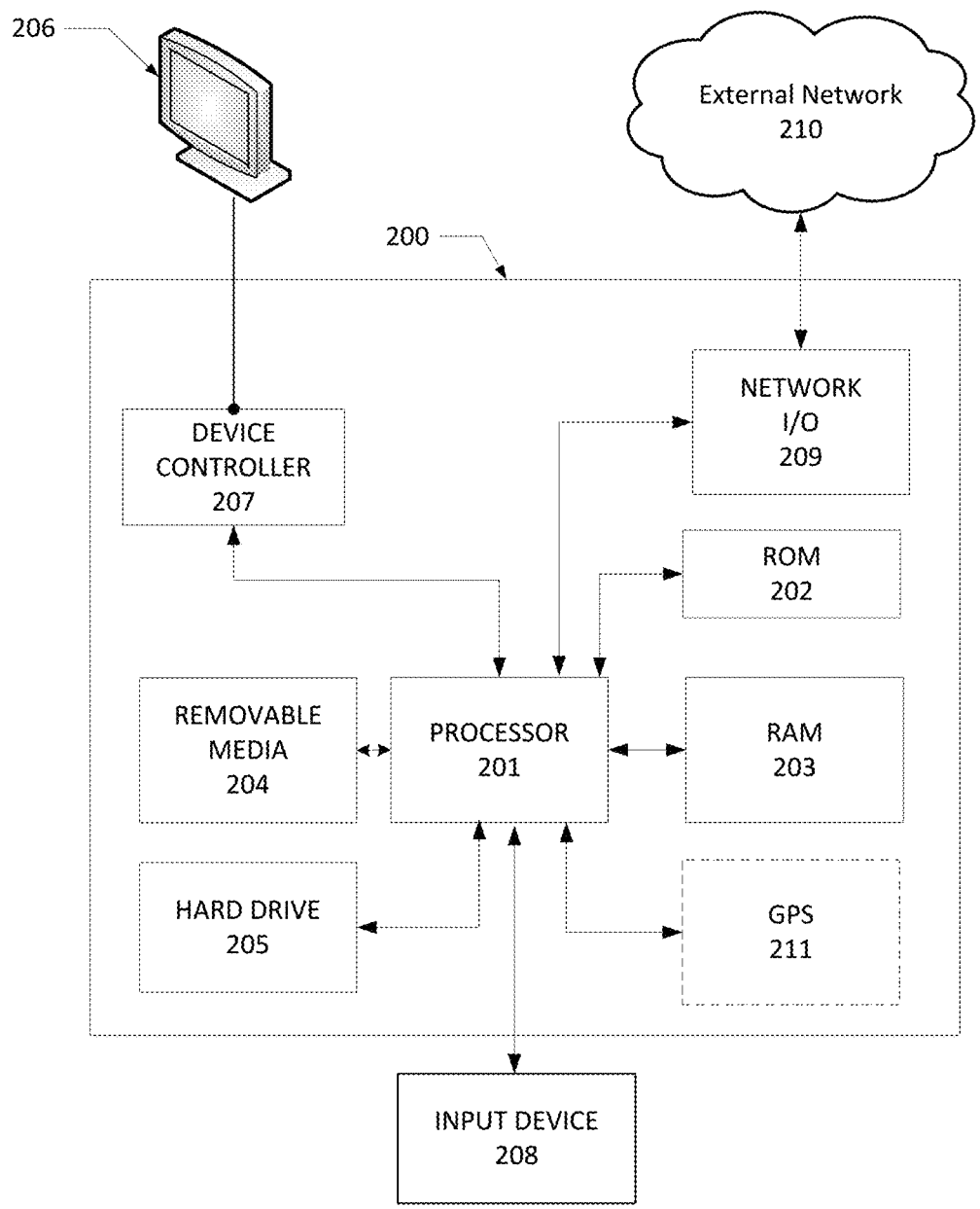
FIG. 2 illustrates an example computing device that can be used to implement any of the system, methods, servers, entities, and computing devices described herein.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be one or more computing devices configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be one or more computing devices configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be one or more computing devices that communicate with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Having described an example communication network shown in FIG. 1 in which various features described herein may be implemented, an example computing device as shown in FIG. 2 will be described.

FIG. 2 illustrates general hardware elements that can be used to implement any of the various systems or computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, camera input for user gestures, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, in some embodiments the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be wholly or partially implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
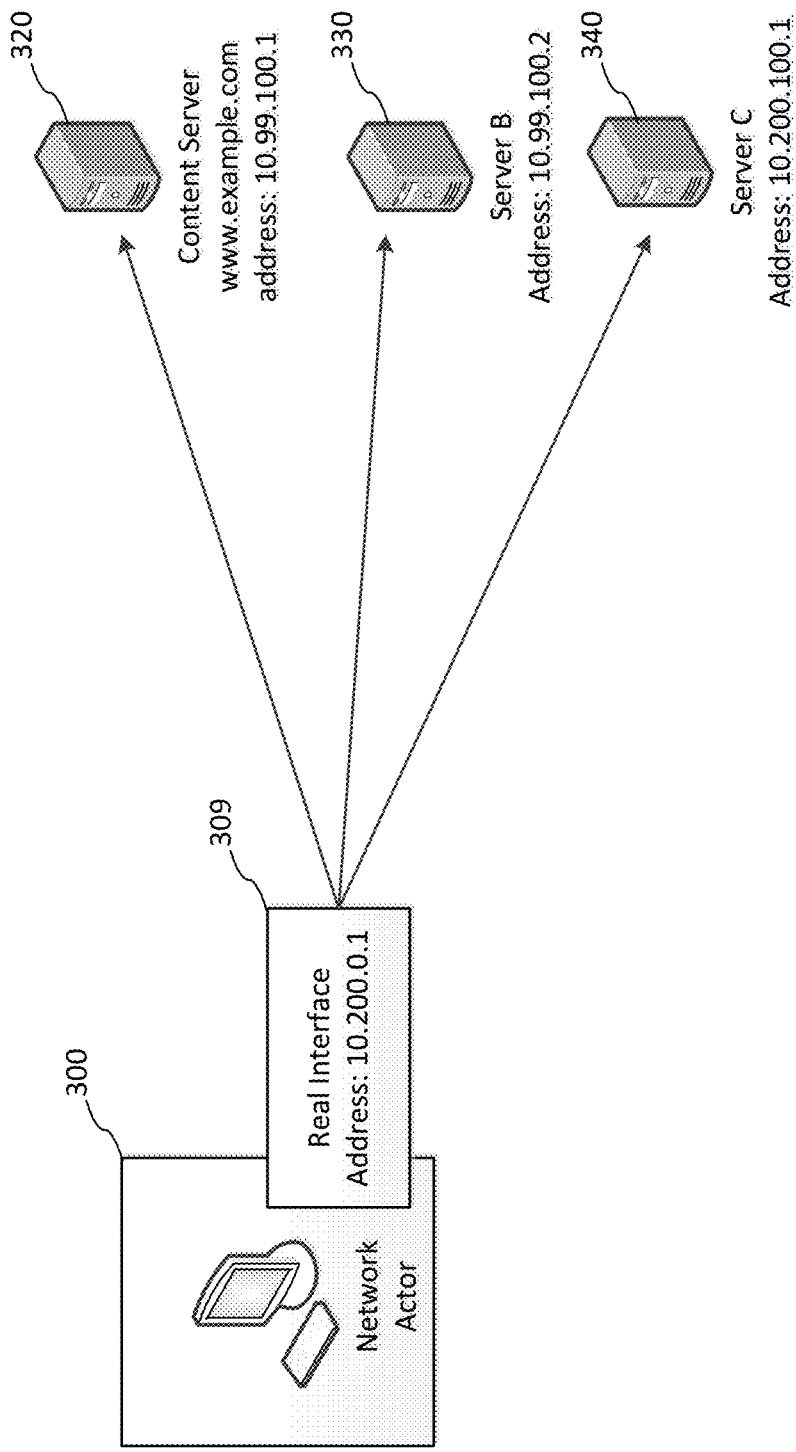
FIGS. 3 and 4 illustrate example network operating environments in which various features described herein may be implemented.
Figure 4:
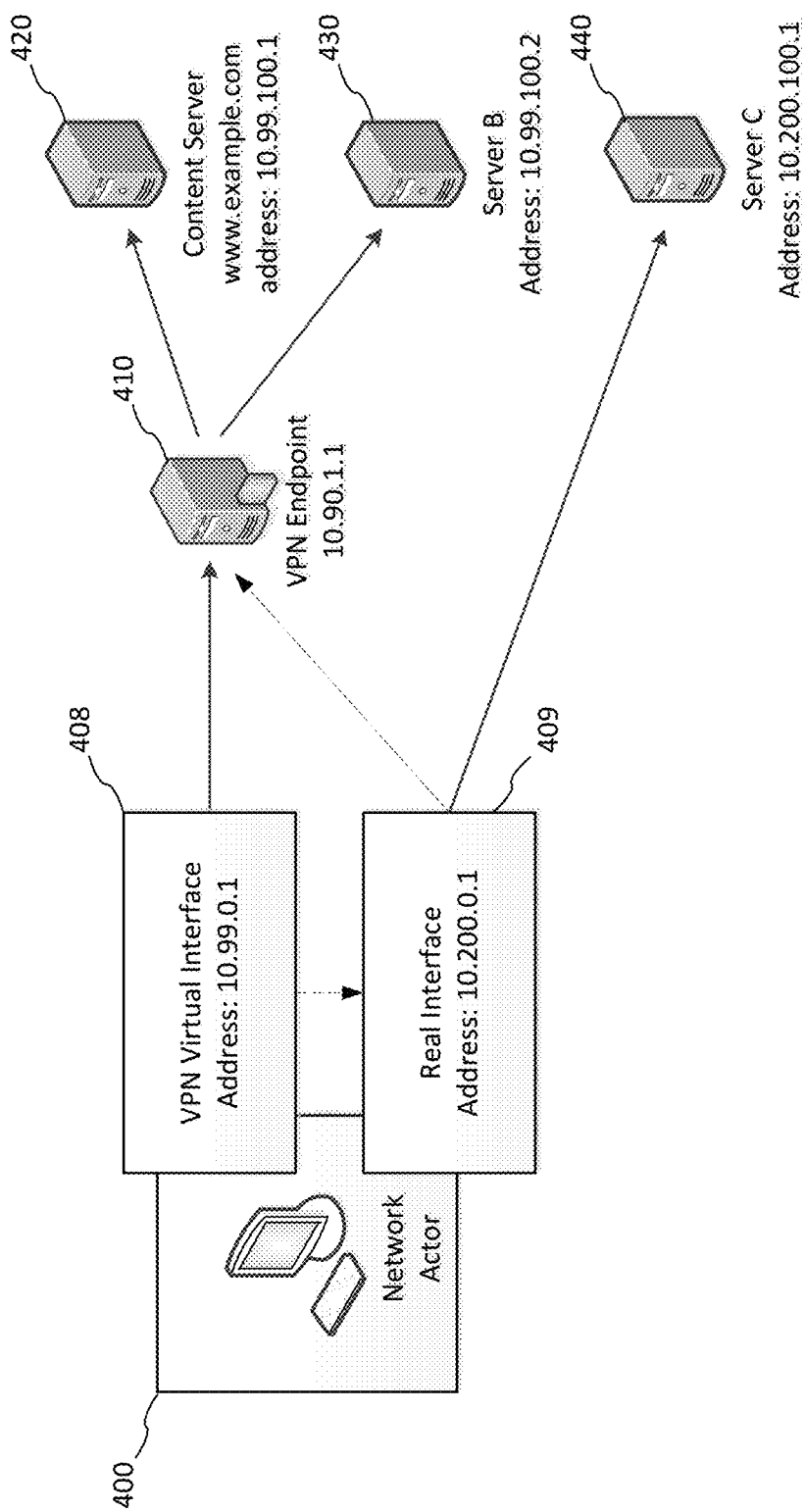

Having discussed an example communication systems, networks and computing devices, discussion will now turn to network operating environments in which the various techniques described herein may be implemented, as shown in FIGS. 3 and 4.

FIG. 3 illustrates a network actor 300 which uses real network interface 309 to access electronic resources over a network, such as external network 109 (FIG. 1). Network actor 300 may correspond to, for example, computing device 200 and/or have similar components to those illustrated in FIG. 2. Network actor 300 may, for example, be located at a premises, such as premises 102a, and may connect to external network 109 by way of local office 103. Using real network interface 309, network actor 300 may communicate with one or more computing devices, such as content server 320, server 330, and server 340 to request and/or access content resources. In the example illustrated in FIG. 3, content server 320 may be accessible by a URL and/or URI such as "http://www.example.com/" which may resolve to IP address 10.99.100.1. Using this IP address, real network interface 309 may communicate requests, responses, interactivity data, and/or other information to content server 320 over the network.

Content server 320 may be operated by a web content provider. Web content providers serve content such as webpages, data files, audio, video, images, programs, and/or other content resources in response to receiving requests from users over a network such as the Internet. Although illustrated as a single server, content server 320 may comprise one or more content servers and may include additional computing devices to manage the operation of content server 320 and perform additional processing, such as processing relating to the methods described herein. Network actor 300 may send a request for a content resource to content server 320 using real network interface 309 and content server 320 may respond to the request by providing the content resource. The request may include a source IP address identifying real interface 309, and content server 320 may use the source address or other information in the request to provide the content resource back to network actor 300 through real interface 309.

Network actor 300, content server 320, server 330, and server 340 may all be part of a computer network, such as the Internet. The network may be divided into logical network segments, which may represent subnetworks in the computer network. A network segment may correspond to one or more IP address blocks. IP address blocks generally refer to groups of IP addresses. An IP address block may be associated with a particular network segment in the global network. IP addresses in an IP address block may share a common characteristic. For example, IP addresses in an IP address block may all be located in a common region. IP address blocks may correspond to different networks and/or subnetworks within the entire IP address space under a given addressing protocol. Aspects described herein may be applied using IP addresses according the IPv4 standard, the IPv6 standard, and/or any suitable protocol for providing network addresses. Two IP addresses residing in different networks, for example in two different class C networks under the IPv4 protocol, may be said to be in different IP address blocks or network segments. As another example, an address residing in an IP address block associated with the United Kingdom may be said to be in a different IP address block from an address residing in an IP address block associated with the United States. Similarly, an address residing in a network segment associated with India may be said to be in a different network segment from an address residing in a network segment associated with China. For example, devices having IP addresses of 10.99.x.x may be said to be in a logical network segment distinct from devices having IP addresses of 10.200.x.x. Logical network segments may be specified at varying levels of granularity. For example, IP addresses of 10.99.x.x and 10.200.x.x are in the same network segment, that of addresses of the form 10.x.x.x. Network segments may, in some embodiments, correspond to geographic regions of the global network. As another example, network segments may correspond to addresses associated with an internet service provider, other network provider, domains, one or more network boundaries, and the like.

Content providers may seek to identify a user location and/or network segment associated with requests for electronic content and vary their responses based on that location/network segment. Such techniques are sometimes referred to as "geoidentification," whereby systems managing content servers differentiate between network actors based on their geographic location. A system operated by the content provider, such as a system managing content server 320, may observe a source IP address of a request for a resource and determine a geographic location of the network actor who sent the request or a network segment including the source IP address of the request. Based on the location of the network actor and/or a network segment including the source IP address, the content server may vary its response to the request. For example, the system may decide to block access by the user based on a location-restricted content license. As another example, a content server may adapt its response to include localized content, such as by including advertisements relevant to the location of the network actor or translating text into a language associated with the location. A system may determine a network actor's location using other methods as well, such as through other parameters in the request, user settings, user agent, accessed URL/URI, GPS data, prompts, any combination thereof, and the like.

As one non-limiting example, content server 320 may be associated with a content provider in the United Kingdom who distributes content, such as a sporting event, with a regionally-limited content distribution scheme (e.g., business rules and/or licenses). The content provider may implement geoblocking techniques using business rules that limit the distribution of the content to users within the licensed region. These business rules, which may be implemented by a content server and/or an associated computing device in a system managing the content server, may specify, for example, that users with IP addresses outside of IP address blocks associated with the approved and/or licensed region should be blocked from accessing the content. A user with an IP address known to be from within the UK may be provided with the content, while a user with an IP address from the United States or elsewhere may be blocked from accessing the content or redirected to a more appropriate site. The content server or associated computing device may observe the source IP address of a request, and may block that request if the source IP address falls outside of the IP address blocks associated with the UK. For example, a user located in the US (having an IP address outside of the UK address blocks and/or residing in a network segment outside of known UK network segments) may be redirected to a US partner licensed to distribute the content, or the request may be blocked and the user may be presented with an error page.

In the example of FIG. 3, network actor 300 may use real interface 309 to access any network source, such as all IP address ranges on the network. Network actor 300 may use real interface 309 to access IP addresses in a network segment associated with the 10.99.x.x block (such as content server 320 and server 330) as well as in a network segment associated with the 10.200.x.x block (such as server 340). Real network interface 309 may have an IP address of 10.200.0.1, in this example. When network actor 300 requests a content resource from content server 320, server 330, and/or server 340, the server receiving the request (or an associated computing device) will see that it originates from real network interface 309 at IP address 10.200.2.2. Content server 320 (or an associated computing device) may implement geoblocking techniques that block access to the requested content by IP addresses outside the 10.99.x.x block, a network segment including all IP addresses beginning with 10.99. That is, requests from IP addresses that do not begin with 10.99 (e.g. are outside the network segment including IP addresses beginning with 10.99) may be denied access to the requested content resource. Server 330, in the example of FIG. 3, has an IP address of 10.99.100.2 and is a member of the 10.99.x.x block. If server 330 or another computing device with a 10.99.x.x IP address were to request the electronic resource from content server 320, for example, the computing device may be allowed to access the electronic resource. Network actor 300 through real interface 309 has an IP address of 10.200.0.1 and may be denied access to the electronic resource.

However, some users may utilize interfaces and/or network link arrangements that may obscure the true locations, network segments, and/or attributes (e.g., IP address) of the users or their associated devices. For example, virtual private networks (VPNs), proxy servers, and/or other intermediaries may be used to bypass content restrictions and/or otherwise hide their real IP address as a source of network traffic. Where a VPN is used, a VPN interface may rewrite and/or otherwise change the outbound/source address of network traffic. Through use of a VPN, proxy server, or other intermediary, network traffic generated by a network actor may appear as though it originated from an IP address associated with the VPN or proxy, rather than the real IP address of the network actor. A content server may receive a request that the network actor generated, but because the network actor is using a VPN, for example, the content server (or associated computing device) will see or otherwise interpret the IP address of the VPN endpoint as the source address. As a result, any geoidentification techniques the content server may implement will utilize the location associated with a network segment used by the VPN endpoint in varying the response, instead of using the actual location of the network actor who generated the request.

For example, the US user discussed above may use a VPN having an endpoint located in a network segment and/or IP address block associated with the UK. Network traffic from the US user may be sent through the VPN and may reach the content server with an apparent source address within the UK address space (i.e., originating from the VPN endpoint). A content server looking to the source address to determine a location of the network actor may see the apparent UK source address (that of the VPN endpoint) and provide the requested resource to the network actor, even though that network actor may otherwise be blocked from accessing the requested resource.

VPN use (or use of other network intermediaries) may be very difficult to detect, as network traffic sent through the VPN appears as normal traffic from the VPN endpoint. Generally, traffic sent through the VPN has been modified such that an external server, such as content server 320, cannot readily tell that the traffic originated at the user's real IP address or that a VPN was used. If an IP address is identified as associated with a VPN endpoint, traffic from that address may be flagged or placed in a blacklist. However, VPN providers constantly change the IP addresses of their VPN endpoints or may use dynamic IP addresses. Further, blacklist techniques may impact otherwise legitimate users with false-positives or when their IP address was previously associated with a VPN endpoint.

Routing network traffic through an intermediary such as a VPN or proxy server may add significant resource costs in terms of, for example, processing, bandwidth, and latency. Further, many sources of content may be location-agnostic and do not differentiate based on location and/or network segment. In such a case, the intermediary may add overhead to network traffic unnecessarily. As a result, a network actor may be configured to route only a portion of its traffic through the intermediary, as will be further discussed through the example VPN configuration illustrated in FIG. 4.

FIG. 4 illustrates an example of a network actor 400 using a virtual private network (VPN) to route a portion of traffic over a network. Network actor 400 may correspond to, for example, computing device 200 and/or have similar components to those illustrated in FIG. 2, and may be operated by a user. Similarly to network actor 300 (FIG. 3), network actor 400 may use real network interface 409 to access some resources on the network. However, network actor 400 may also implement a virtual network interface 408 to send traffic using the VPN for a subset of destination network addresses. For example, as illustrated in FIG. 4, network actor 400 may be configured to send traffic to IP address block 10.99.x.x through virtual network interface 408. Network actor 400 may use virtual network interface 408 to communicate with content server 420, with IP address 10.99.100.1, and server 430, with IP address 10.99.100.2. Network actor 400 may use real network interface 409 to communicate with network devices outside the 10.99.x.x address block, such as server 440 with IP address 10.200.100.1. As in FIG. 3, although illustrated as a single server, content server 420 may comprise one or more content servers and may include additional computing devices to manage the operation of content server 420 and perform additional processing, such as processing relating to the methods described herein.

All traffic to a particular domain and/or range of IP addresses may be sent through the VPN using virtual network interface 408, while all other traffic may be sent using real network interface 409 without using virtual network interface 408. For example, a US user seeking to access content stored on a UK server may configure his computer to utilize a virtual network interface to communicate with the UK server. The US user may configure his computer to route all traffic directed to the UK server's IP address, addresses in UK address blocks, and/or addresses in a UK-associated network segment to be sent using the VPN, while traffic to any other IP address remains routed from the US user's real IP address. Such a configuration may be referred to as a "split tunnel VPN."

Using the virtual private network (VPN), for example, provides the network actor with an alternate network transport path instead of the pathway that would otherwise be selected by the user's device and/or network for the packets it sends to and receives from a server on the network. A network route table of the network actor may be updated to direct network traffic to network addresses handled by the VPN to be sent via the virtual network interface to the VPN. This redirection may be for all network addresses or a subset of network addresses. Network traffic to the VPN endpoint server and to any network address not handled by the VPN continues to be routed by the real network interface on the computer.

Traffic intended to be routed through the VPN may be encapsulated by virtual network interface 408 based on the protocols used by the VPN. The traffic may be encapsulated such that the VPN may be able to identify the network actor who generated the traffic and where responses should be sent. Though the traffic intended to be routed through the VPN may be logically sent via the virtual network interface 408, the encapsulated traffic may sent by real network interface 409 to virtual private network (VPN) endpoint 410, as indicated by the dotted line in FIG. 4. VPN endpoint 410 may extract the traffic and send it on to the destination device (or to some intermediate destination/device in the network), identifying an IP address of VPN endpoint 410 (10.90.1.1) as the source address of the traffic. The VPN may route any response received from the destination device to network actor 400. Some aspects of the disclosure may utilize the nature of split-tunnel VPNs to identify when a network actor may be using a VPN and/or proxy server.

According to some aspects described herein, a system comprising a content server may determine whether a network actor appears to be using an intermediary such as a VPN and/or proxy server. This may be accomplished, in some embodiments, by directing the network actor to request a resource that will enable the system to identify a network segment and/or geographic location associated with the network actor. Such a resource may be referred to as a network-segment identification resource and/or a geolocation resource, in some embodiments. The identification resource may be stored in a different network segment from that of the content server, such as in another region of the global network. When a content server receives a request for content from a network actor, the content server may include in a response (such as a webpage) one or more links and/or other identifiers pointing the network actor to resources hosted on servers in other network segments. The links to the resources hosted in other network segments could also be provided for reasons other than a request for content, such as a network integrity check. The network actor may access the network-segment identification resources using the links or identifiers, and the system may use information about the request for the network-segment identification resource to determine whether the network actor is associated with multiple source addresses. The links and/or other identifiers pointing to the resources hosted in other network segments may be included in such a manner that the network actor or a computing device associated with the network actor will automatically retrieve the linked resource. In some embodiments, the identifier and/or link used to include the network-segment identification resource may be associated with the network actor, and the content server may utilize the identifier to determine when that particular network actor accesses the network-segment identification resource. The identifier may be used to distinguish the network actor from other network actors. A method according to one or more of these features is illustrated in FIG. 5 and discussed further below.

Figure 7:
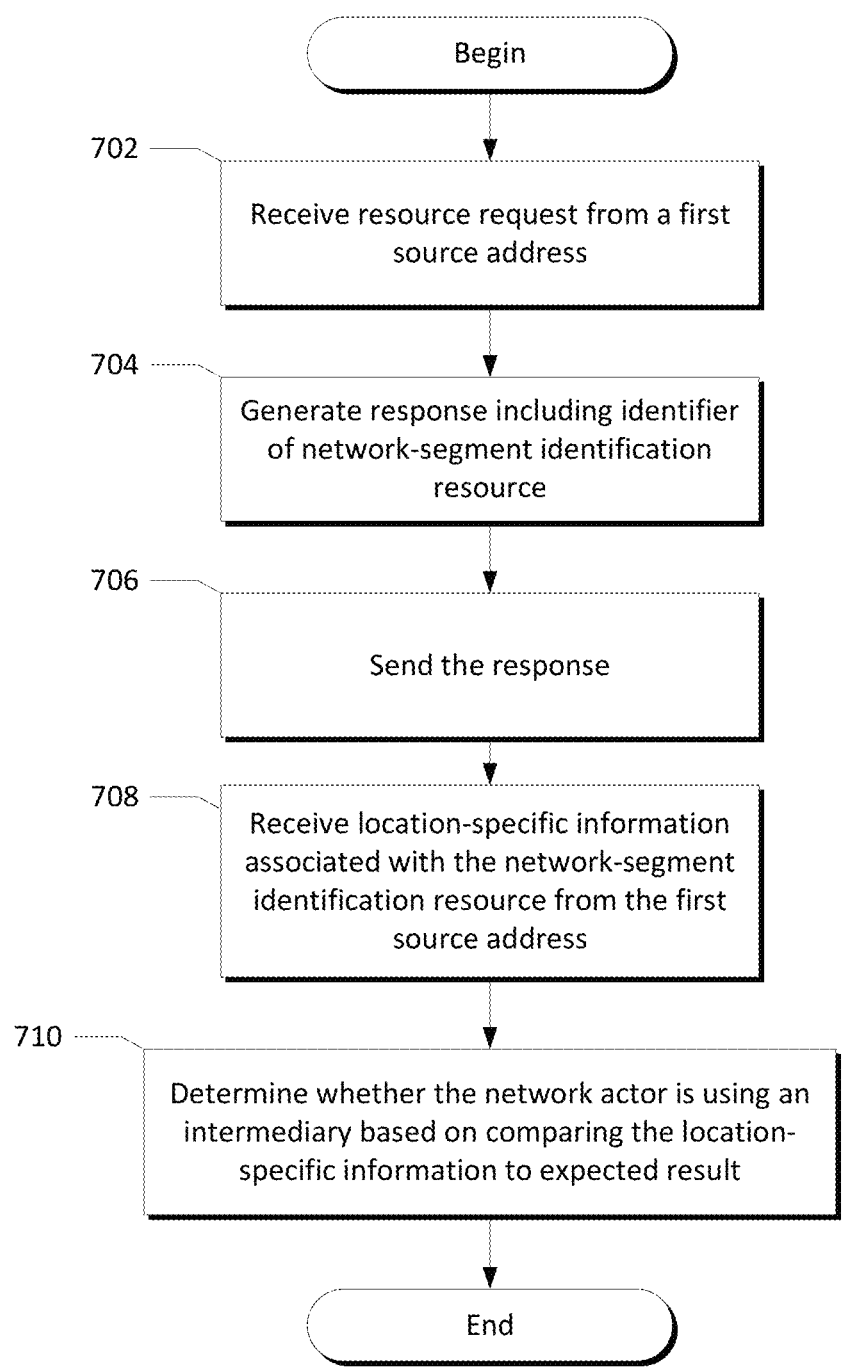
FIG. 7 illustrates another example method for implementing various features described herein.

In other embodiments, the system may determine whether the network actor is associated with multiple source addresses based on particular (e.g., predetermined and/or location-specific) content returned to the network actor in response to a request for the network-segment identification resource. The system may challenge the network actor by asking the network actor to describe and/or otherwise provide one or more attributes of location-specific content returned from a network-segment identification server. Based on known and/or expected regional results, the system may determine a location used to access the network-segment identification resource and compare this location to a location associated with the original request for the electronic resource (as received by the content server). Similarly, the system may determine a network segment used to access the network-segment identification resource and compare this network segment to a network segment associated with the original request. The system may then direct the content server to take appropriate action based on the determined location and/or network segment information. A method according to one or more of these features is illustrated in FIG. 7.

Figure 5:
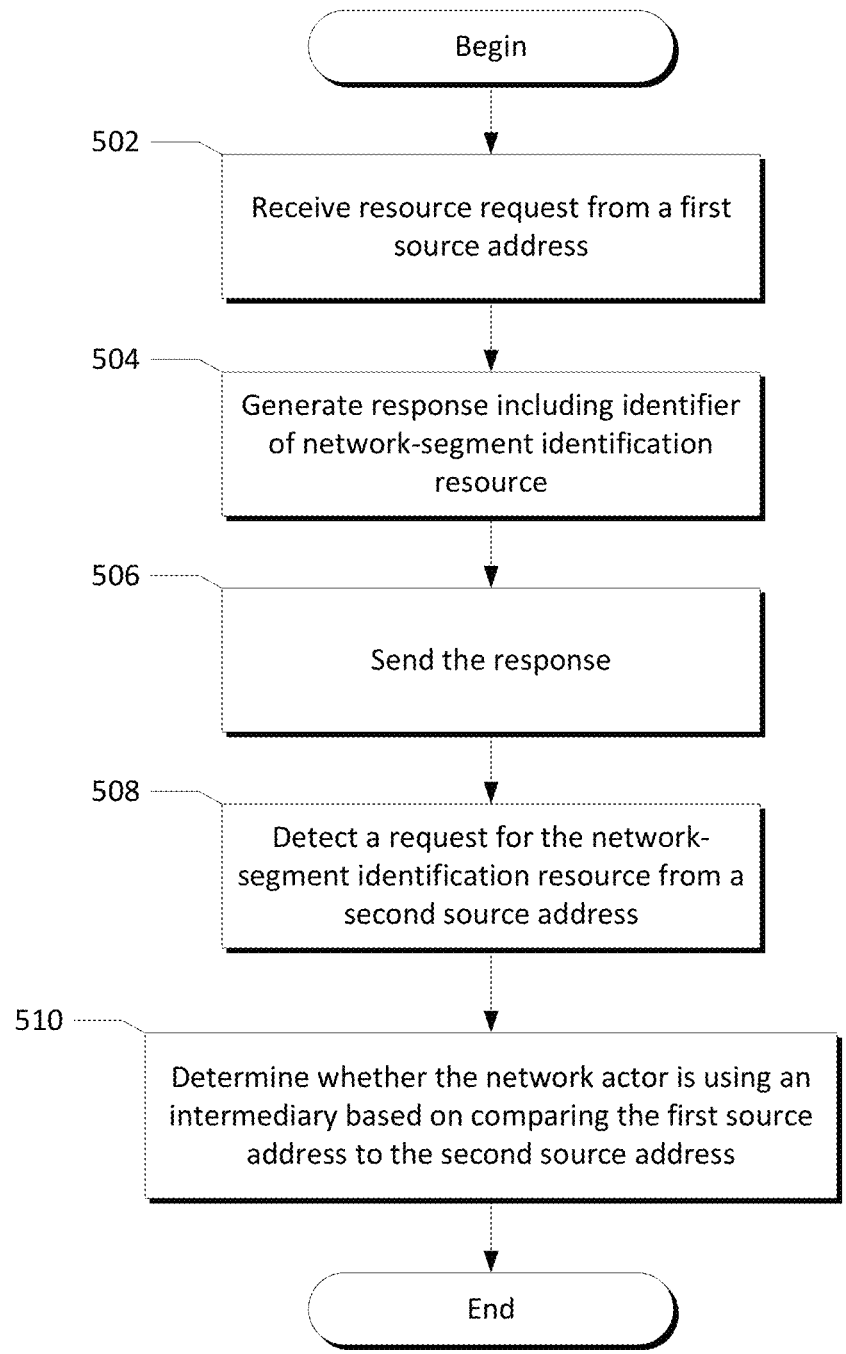
FIG. 5 illustrates an example method for implementing various features described herein.

FIG. 5 illustrates an example method for detecting use of an intermediary such as a VPN and/or proxy server according to some embodiments. The method of FIG. 5 may be implemented by a system comprising one or more computing devices, such as computing device 200 (FIG. 2). The method may be implemented by a processor of the one or more computing devices, and executable instructions according to the method may be stored on a memory of the one or more computing devices. The one or more computing devices may be part of a network, such as network 109 (FIG. 1). The method may be implemented by a content server, such as content server 420 of FIG. 4, alone or in combination with other computing devices. For example, the methods illustrated herein may be implemented by a system managing a content server. The process may be implemented in a network environment having devices such as servers 430 and 440, a network actor such as a user's consumption or access device (e.g., display device 112, gateway 111, personal computer 114, wireless device 116, etc.), or any other desired computing devices. The one or more computing devices may receive requests and send responses over the network. In one embodiment, the method may be implemented by a content server operated by a web content provider.

In step 502, a computing device may receive a request for a content resource from a first source address. Alternatively and/or additionally, the request may be a provisional request for a content resource or an authentication request prior to a request for a content resource. The request may be generated by and associated with a network actor, such as network actor 400 of FIG. 4. The request may be received and/or sent using any suitable protocol. For example, the request may be an HTTP request for a URL associated with the content resource. The request may include an indication of a first source address associated with the network actor. For example, data packets used to transmit the request may have an assigned source address value that the content server may observe. For example, a US user may request a video stream of a live sporting event from a content server in the UK at http://www.example.co.uk/.

Where the network actor uses a real network interface to communicate with the content server, such as in FIG. 3, the content server may be able to determine a real IP address of the network actor by inspecting the source address included in the request. From this IP address, the content server may determine a location and/or network segment associated with the network actor and take appropriate actions, such as geoblocking, adapting content, and/or providing alternate content. However, where the network actor is using an intermediary to communicate with the content server, such as a VPN as in FIG. 4, the content server may not be able to determine an accurate IP address of the network actor as the first source address included in the request is that of the VPN endpoint used to send the request. As a result, the content server may mistakenly assume that a location determined based on the IP address of the VPN endpoint corresponds to a location of the network actor. For example, a US user may be using a VPN with an end point in the UK IP address space. A UK content server may see the first source address as that of the VPN endpoint and allow the US user to access the video stream, even though business rules may be in place to prevent access by users from outside the UK. Thus, according to some embodiments, the computing device may proceed to step 504 to determine whether the network actor appears to be using an intermediary such as a VPN or proxy server.

In some embodiments, the computing device may perform an optional step of analyzing the first source address using one or more business rules based on a location and/or network segment associated with the first source address before proceeding to step 504. If the computing device determines that the network actor should not be granted access to the content, or some other appropriate action be taken based on the location or network segment associated with the first address, the computing device may halt execution of the method and take the appropriate action. For example, if the first source address indicates that the user should be blocked from accessing the content, the computing device may return an error message to the user rather than continue on to step 504. In some embodiments, the computing device may take further action before continuing to step 504 based on a location and/or network segment associated with the first source address. If the computing device determines that the network actor is allowed to access the content, the computing device may proceed to step 504 to determine whether the network actor appears to be using an intermediary such as a VPN or proxy server. However, in other embodiments, this optional step is omitted and the computing device may proceed from receiving the source request in step 502 to generating a response to the request in step 504 as discussed further below.

In step 504, the content server may generate a response to the request. The response may include the requested electronic resource in a form suitable for presentation to or at the network actor. For example, the response may be a webpage capable of being rendered by a web-browser. The webpage could be generated and/or provided in a suitable markup language, such as HTML or XML. The webpage may include other electronic resources through, for example, tags in the markup language and a URL/URI of the other electronic resources. For example, the webpage may include an image tag as part of the markup language. The image tag may specify a source attribute instructing a browser to retrieve data, such as an image, through a URL/URI and include it in the rendered webpage. In other embodiments, the response could take other forms such as a document, presentation, video file, image file, audio file, executable file, script, applet, stream, and/or any other suitable response associated with the request for the electronic resource. In the illustrative scenario, for example, the response may comprise a webpage including an applet and/or embedded player for viewing the video stream.

In generating the response, the content server or an associated computing device may include an identifier of a network-segment identification resource and/or a geolocation resource. The resource used as the network-segment identification resource may have been created specifically for such identification purposes, or it may be an existing resource useable and/or adapted for identification purposes. The network-segment identification resource may, in some embodiments, be an electronic resource available at a location other than the content server, such as at a network-segment identification server. The network-segment identification resource may be any resource available on the network and accessible by the network actor. For example, in the networking environment illustrated in FIG. 4, the network-segment identification resource may be an electronic resource available at server 430 and/or server 440. In some embodiments, the content server or associated computing device may select a network-segment identification server located in a different IP address block than an IP address block containing the content server. For example, where the content server is located in an IP address block associated with regional addresses in the United Kingdom, the content server may include an identifier of a network-segment identification resource hosted outside that regional address block, such as content hosted at an IP address in an IP address block associated with United States regional addresses. In some embodiments, the content server may select a network-segment identification server located on a different network segment than a network segment containing the content server. The content server may include one or more identifiers of one or more network-segment identification resources, and each may be available from different servers that may each be in different network segments. In some embodiments, the network-segment identification resource may be electronic content for inclusion in a webpage or other response provided by the content server. For example, the network-segment identification resource may be an image provided by a network-segment identification server other than the content server. The network-segment identification resource may comprise any data, such as an image, text portion, markup document, script, video file, audio file, applet, document, and/or any other content suitable for inclusion in a presentation of the response from the content server.

The identifier of the network-segment identification resource may be a URL/URI inserted into the response as a pointer the network-segment identification resource on the network. The identifier may be used by the network actor to access and/or retrieve the network-segment identification resource, such as through an HTTP request similar to that used by the network actor to request the electronic resource from the content server. In some embodiments, the identifier may be generated and/or selected in order to distinguish the network actor from other network actors accessing the network-segment identification resource. For example, a portion of the identifier may be generated and/or selected so as to uniquely identify the network actor and/or request for the electronic resource. In some embodiments, the identifier need not be completely unique, but only sufficiently so as to distinguish the network actor from other network actors accessing the content server within a reasonable timeframe. For example, identifiers may be unique over a day, week, month, or other period of time but repeat on a larger scale. In other embodiments, the identifier may be selected and/or generated to identify the first source address. In some embodiments, identifiers may be selected from a pool of predetermined identifiers so as to uniquely identify the network actor.

Multiple identifiers may point to the same network-segment identification resource. For example, different identifiers generated for different network actors may resolve to the same network-segment identification resource. In some embodiments, the identifier may include a portion that uniquely identifies the network actor and/or first source address, while the remainder of the identifier can be used to locate the network-segment identification resource. For example, the uniquely identifying portion could be a parameter or other delineated portion of the URL/URI. While this portion of the identifier would be included in a request for the network-segment identification resource, it may be disregarded by the network-segment identification server in locating the network-segment identification resource. In some other embodiments, the whole identifier may be used to locate the network-segment identification resource, and at least a portion of the identifier may be used to identify the network actor. The identifier may include a portion generated based on an attribute associated with the network actor and/or the request for the electronic resource, such as the first source address. For example, a portion of the identifier may be generated by performing a hash function on the first source address. For additional security, generating the identifier may include adding cryptographic salt or other values to the first source address, for example, thereby rendering the identifier generation process more difficult to reverse engineer or spoof. In some embodiments, the identifier may be generated based on a session ID or other session-based value associated with the network actor and/or the request. In still other embodiments, the identifier may include a unique key value associated with the request for the electronic resource and/or the first source address.

In the example discussed above, the UK content server may include an image tag in the webpage (or other transmission) containing the video stream. The image tag may have as a source a URL pointing to a server in the US. The URL may include a portion identifying the network actor. For example, the identifier of the network-segment identification resource included in the webpage with the video stream could be: http://www.us_site.com/bin/images/flag.jpg?userid=10.20.1.1. The 'userid' element included in the identifier may distinguish the US user from other network actors who may access the network-segment identification resource, flag.jpg. In practice, the identifiers may be more obscure and difficult for users to detect and/or decode. For example, as described above, various cryptographic techniques may be used to encode information about the network actor into any portion of a URL/URI. Additionally and/or alternatively, the identifier may include a value generated by the content server and associated with the network actor through a table and/or other listing. In some embodiments, the content server may supply a table associating the network actor with a given identifier or identifier portion to the network-segment identification server for use in recognizing the network actor. In other embodiments, the content server itself may use the table to recognize network actors associated with an assigned ID and/or other value generated by the content server.

In step 506, the content server may send the response with the included identifier to the network actor in response to the request. The response may be sent back to the first source address indicated in the request. Where the network actor is using a VPN to access the content server, for example, the first source address may be the IP address of the VPN endpoint and the response may be sent to the VPN endpoint. The VPN endpoint may be configured to provide the response to the network actor. The network actor may use other intermediaries in addition to or in lieu of the VPN, such as a proxy server, to change an apparent first source IP address.

In step 508, the content server may detect the occurrence of a request for the network-segment identification resource based on the identifier by the network actor from a second source address. The network-segment identification resource may be hosted on a network-segment identification server separate from the content server, such as server 430 or server 440 of FIG. 4. The identifier of the network-segment identification resource included in the response may resolve to the network-segment identification server and be used by the network actor in a request for the network-segment identification resource. The network-segment identification server may receive the request from the network actor and respond with the requested network-segment identification resource. In some embodiments, a particular network-segment identification resource hosted by the network-segment identification server may have a one-to-many relationship with the identifiers. That is, the network-segment identification server may respond to one or more requests based on different identifiers with the same network-segment identification resource. The network-segment identification server may log or otherwise note the identifier used in the request and a second source address associated with the request. In other embodiments, other information about the network actor may be used to identify when a same network actor that requested the electronic resource from the content server is requesting the network-segment identification resource from the network-segment identification server, such as session information, cookies, certificates, established communication sessions, user name, device ID, and/or any other appropriate information.

By recording (or otherwise associating) the identifier and second source address used to access the network-segment identification resource, in some embodiments, the network-segment identification server may enable the content server or associated computing device to identify that a same network actor made both the request for the content resource and the network-segment identification resource, as well as enable the system to assess the first and second source addresses. As discussed above in regard to FIG. 4, where the network actor makes use of an intermediary such as a split tunnel VPN, the network actor may utilize the VPN for only a portion of outbound network traffic. If the content server is within a network segment handled by the VPN, requests sent to the content server from the network actor may have a first source address associated with an endpoint of the VPN. If the network-segment identification server is located outside the network segment handled by the VPN, requests for the network-segment identification resource may be made using a second source address, the real address of the network actor. Thus, in some embodiments the network actor may be directed to reveal its real IP address as a result of accessing a network-segment identification resource outside the address space handled by the VPN (or other intermediary). Other scenarios are possible where different source addresses are used to access the content resource and network-segment identification resource. For example, the content server may be outside the address space handled by the VPN and the network actor may see the real IP address of the network actor while a VPN is used to access the network-segment identification resource. As another example, two different VPNs may be used to access different address spaces.

The content server or associated computing device may receive information regarding (or otherwise detect) the occurrence of the request for the network-segment identification resource and/or a request based on the identifier in any suitable manner. In some embodiments, the content server may query the network-segment identification server to determine whether a request using the identifier has been received by the network-segment identification server. The network-segment identification server may respond to the content server with a response including the second source address, the source address used to access the network-segment identification resource. Based on the identifier used in the request for the network-segment identification resource, the content server and/or network-segment identification server may be able to identify that the network actor requesting the network-segment identification resource is the same network actor who requested the electronic resource from the content server.

In other embodiments, the network-segment identification server may be configured to notify the content server of the request and provide the second source address and identifier used to access the network-segment identification resource. The network-segment identification server may provide the identifier used, time and date of access, IP address, content accessed, and any other relevant information to the content server. For example, the network-segment identification server could provide network route information regarding a network path used to route the request from the network actor to the network-segment identification server. In some embodiments, the identifier used in a request for the network-segment identification server may instruct and/or prompt the network-segment identification server to notify the content server of the request. For example, the identifier may include an indication of the content server, a flag indicating that notification is requested, and/or a value identifying or otherwise associated with the network actor. The identifier may include script portions that are operable on the network-segment identification server to provide the content server with a notification regarding the access and the second source address.

In some embodiments, the content server may take steps to detect the occurrence of the request for the network-segment identification resource immediately or shortly after processing the request for the electronic resource. For example, the content server may process the request for the electronic resource, generate the response including one or more identifiers of network-segment identification resources, and send the response to the requesting network actor. The content server may wait a brief amount of time, such as a few seconds, before querying the network-segment identification server to see whether a request has been made using the identifier. In other embodiments, the content server may take steps to detect the occurrence of the request for the network-segment identification resource by the network actor at any time after sending the identifier to the network actor. For example, the content server may process multiple requests in a batch manner at appropriate time periods, such as where the server confirms network actor locations every hour or overnight during periods of reduced network activity. Similarly, the network-segment identification server may send notification of the request for the network-segment identification resource using the identifier as soon as the request has been processed or the network-segment identification server may wait until some later time to send the notification.

In some embodiments, the content server may delay taking the steps to detect the occurrence of the request for the network-segment identification resource until another request is received by the content server from the same network actor. For example, the content server may receive a first request for a first web page from a network actor identified by a source address. The content server may respond to the first request with the first webpage including one or more identifiers of network-segment identification resources. The content server may subsequently receive a second request for a second webpage from a network actor. The content server may determine, based on a source address of the second request, that the same network actor generated the first and second requests. The determination that a same network actor generated the first and second requests may be based on any other appropriate information, such as session information, cookies, certificates, established communication sessions, user name, device ID, and the like. In response to determining that the second request was generated by the same network actor as the first, the content server may take steps to detect a request for the network-segment identification resource on the network-segment identification server as described above. For example, prior to serving the second webpage to the network actor, the content server may query the network-segment identification server to confirm whether the network actor accessed the network-segment identification resource using the identifier provided in the first webpage.

In step 510, the content server or associated computing device can determine whether the network actor is or appears to be using an intermediary. For example, after having received information associated with the request for the network-segment identification resource based on the identifier in step 508, the content server or associated computing device may compare a second source address associated with the request for the network-segment identification resource to the first source address (associated with the request received by the content server in step 502). In some implementations, the second source address may represent the source IP address that the network actor uses in requests to certain IP address blocks including the network-segment identification server, while the first source address may represent the source IP address that the network actor uses in requests to certain IP address blocks including the content server. In the example of FIG. 4, network actor 400 may be configured to send traffic to IP address block 10.99.x.x through virtual network interface 408 with a source address of 10.99.0.1, that of VPN endpoint 410. Network actor 400 may use real network interface 409 to communicate with network devices outside the 10.99.x.x address block with a source address of 10.200.0.1. Continuing the example, source address 10.90.1.1 could be the first source address used to access a content server, such as server 420, and 10.200.0.1 could be the second source address used to access a source that comprises or is associated with a network-segment identification server, such as server 440. The content server may determine whether the first source address is different from the second source address.

Based on comparing the first and second source addresses, according to some embodiments, the content server may determine whether the network actor's behavior suggests that the network actor may be using an intermediary such as a VPN and/or proxy server for some network communications. If the first source address is different from the second source address, the network actor may be using an intermediary or otherwise attempting to reroute network traffic, thereby obscuring, hiding, or otherwise misrepresenting the identity of the network actor. That is, the content server may compare a source address used to access the content server with a source address used to access the network-segment identification server and determine whether the network actor appears to be using an intermediary such as a VPN and/or proxy server. Both source addresses may be determined to be associated with the network actor as a result of the exemplary and non-limiting techniques described above. If the source addresses (or other relevant attributes) are not the same, the content server may determine that network traffic to the content server and/or network-segment identification server is being routed or sent through an intermediary such as a VPN and/or proxy server.

In other embodiments, additional and/or alternative analysis may be performed. In some embodiments, the content server may utilize an evaluation function as part of, in lieu of, or in addition to step 510 to assess whether the network actor's behavior suggests that the network actor may be using a VPN, proxy server, and/or other intermediary. The evaluation function may be a scoring function based on the first source address and one or more second source addresses. The evaluation function may be based on additional information collected during steps 502 or 508, for example. The evaluation function may analyze a network distance between the first source address and a second source address. For example, address 10.1.1.1 and 10.1.1.2 would be determined as near to each other while 10.1.1.1 and 10.255.1.1 are far apart. Where the two addresses are evaluated as having a short network distance between them based on the above or any other appropriate methods, it may be determined that VPN use is not likely and/or not of concern to the content server. If the two addresses have a larger network distance between them, the evaluation function may indicate that VPN and/or proxy use is likely.

The evaluation function may be based on determining whether the first source address and the second source address reside in different network segments of the global network. The evaluation function, in some embodiments, may be further based on additional network information related to the original request for the content resource and the request for the network-segment identification resource. For example, the evaluation function may obtain and analyze a network route path from the content server to each of the first source address and the second source address. Attributes of the network route path may be analyzed to evaluate the likelihood of VPN use, such as latency and/or packet loss rates. As another example, the evaluation function may utilize a database that associates addresses with network segments, network providers, and/or geolocation information as part of evaluating the likelihood that the network actor is using a VPN, proxy server, and/or other intermediary. Through the evaluation function, the content server may create a score of how likely it is that the network actor is using a VPN and/or other intermediary based on the observed network activity and take appropriate actions based on the score and/or a determination regarding VPN use.

As noted above, in some embodiments the content server and/or associated devices may include more than one network-segment identification resource in one or more communications to the network actor, such as in the response to the request for the content resource. For example, the response may include an identifier that points to a server within a same regional IP address block as the content server, and one or more identifiers that point to servers outside of that regional block. The identifiers may point to servers in several other regional blocks. For example, the UK content server could include an identifier pointing to a server in the UK, another identifier pointing to a server in the US, and yet another identifier pointing to a server in Indonesia. In some embodiments, the response could include multiple identifiers pointing to servers in different sub-regions in a particular country. For example, a content server located in the US may include network-segment identification resources from different regions within the US in its response. By including multiple network-segment identification resources located in different locations and IP address blocks, the content server may be able to better identify when a requesting network actor is using a VPN and/or proxy server and determine other information about the scope and/or nature of the intermediary use.

According to some aspects, using more than one network-segment identification resource may allow the content server to more accurately identify whether the network actor is using a VPN (or other intermediary) and further identify a likely real address of the network actor. In some embodiments, a content server located in a first region and/or IP address block may send a response including identifiers of a first network-segment identification resource and a second network-segment identification resource. For example, a UK content server may include identifiers of network-segment identification resources located in the US and Brazil. The content server may detect a request for each of the network-segment identification resources using the identifiers and an associated source address used to access each. The content server may compare the source address of the original request received by the content server with the source addresses used to access each of the network-segment identification resources. Based on this comparison and the known locations of each network-segment identification resource, the content server may determine whether the network actor is using a VPN and which address may be more likely to be the real address of the network actor. For example, if the source addresses used to access the first and second network-segment identification resources match each other, but they do not match the source address of the request received by the content server, the content server may determine that the address used to access the network-segment identification resources corresponds to a real address of the network actor.

Based on determining that the network actor may be using an intermediary such as a VPN and/or proxy server, the content server and/or associated computing device can take any appropriate action. For example, in some embodiments the content server may block access by users determined to be using VPNs, proxy servers, and/or other intermediaries. In some embodiments, the content server may use the second source address used to access the network-segment identification server as primary or additional input into various network-segment identification and/or geoidentification content rules. For example, the content server may decide to block access by the user based on a determined network segment of the second source address. As another example, the content server may adapt its response to include localized content based on the second source address, such as by including advertisements relevant to the location of the network actor or translating text into a language associated with the location. In some embodiments, locations and/or network segments associated with both the first and second source addresses may be used to determine a result of network-segment identification and/or geoidentification content rules. For example, the network actor may be allowed to view location-restricted content if the locations associated with both source addresses fall within the permitted locations.

Still other actions may be taken by the content server or associated computing device based on determining that the network actor may be using an intermediary such as a VPN and/or proxy server. For example, the content server may offer to redirect the network actor to a server that provides the requested service and/or related services to users in a determined location and/or network segment of the network actor. As another example, the content server may offer to charge appropriate access costs to the network actor and/or a network segment determined to be associated with the network actor. In both examples, the content server may act without prompting the network actor, such as by performing an automatic redirect. As another example, the content server or managing system may determine that the requested content may be scheduled to be available to users in the determined location and/or network segment at a later time or under different conditions. This may be the case, for example, with sporting events having a time delay in different time zones or regions. In such a case, in some embodiments, the content server or managing system may offer to or begin automatically scheduling the content for recording or display when available. Other actions may include setting an alert for when the content may be available and/or providing an option to purchase early access to the program.

Where multiple identifiers associated with multiple network-segment identification resources are included in the response to the request for the electronic resource, the content server or associated computing devices may determine a probable real address associated with the network actor and base network-segment identification decisions on the probable real address. For example, if a first source address is used to access a content server in the UK, but a second source address is used to access network-segment identification servers in the US and Brazil, the content server or system may determine that the second source address is a probable real address of the network actor and base network-segment identification techniques on the probable real address. As a result, the content server may provide the network actor with appropriate content based on the probable location of the network actor.

In some embodiments, the content server and/or associated computing devices may store records of the first and second source address pairs, and these records may be analyzed to detect patterns and trends. If a particular source address used to access the content server is associated with more than one second source address, the content server may determine that the particular source address corresponds to a VPN endpoint, a proxy server, and/or another intermediary device. That is, if the content server receives multiple requests from a first source address but observes that different source addresses are detected according to the network-segment identification techniques above, the content server may conclude that the first source address is associated with a VPN endpoint (or other intermediary device). For example, the content server could receive a first request from a first source address and detect a second source address is used to access a network-segment identification resource stored on a network-segment identification server. The content server could later receive a second request from the first source address and detect a third source address used to access the network-segment identification resource on the same network-segment identification server. The content server may determine that the first source address is associated with more than one network actor and may be a VPN endpoint. Additional criteria may be used to better and/or more accurately determine addresses associated with VPN endpoints (or intermediary devices), such as waiting until a threshold number of different actors have used a first source address before determining it to be a VPN endpoint. Known and/or determined VPN endpoints may be added to a blacklist used by the content server to quickly identify access by the VPN.

Figure 6:
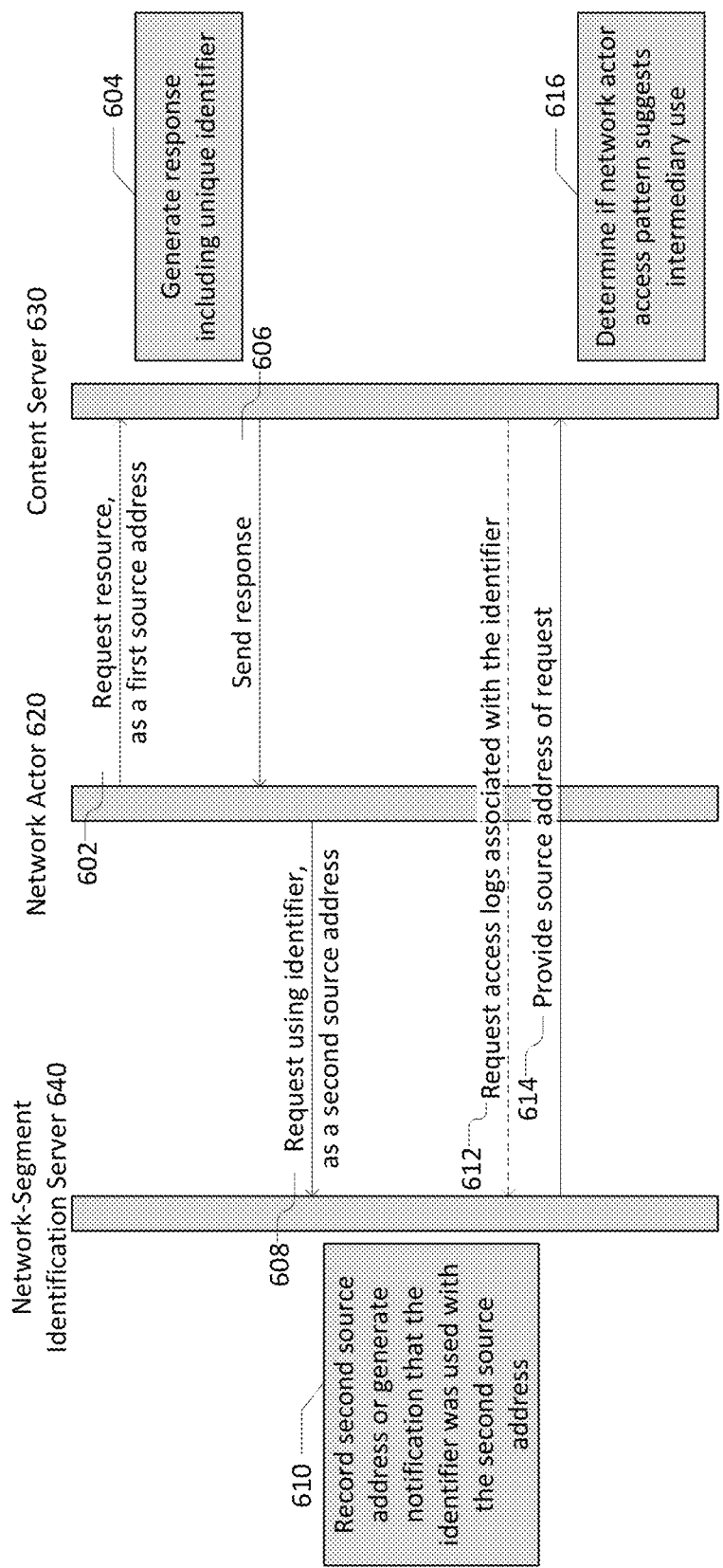
FIG. 6 illustrates an example process flow for implementing various features described herein.

FIG. 6 illustrates an example process flow that corresponds to various methods enabled by the disclosure, such as the method illustrated in FIG. 5. A system may include network actor 620, content server 630, and network-segment identification server 640, each of which may be implemented by one or more computing devices in communication over a network. At step 602, network actor 620 may request a content resource from content server 630 and be identified and/or identify itself as a first source address.

At step 604, content server 630, or an associated device as part of a system for managing content server 630, may generate a response to the request. In some embodiments, the response may include an identifier configured to distinguish network actor 620 from other network actors or otherwise assist in assessing network behavior of network actor 620. The identifier may uniquely identify network actor 620 over some reasonable scope, such as within a predetermined period of time. The identifier may be included in the response in such a manner as to direct network actor 620 to automatically retrieve a network-segment identification resource. For example, the identifier may be included as an image tag in a webpage sent in response to the request for the content resource. In step 606, content server 630 may send the response to network actor 620.

At step 608, network actor 620 may request a network-segment identification resource from network-segment identification server 640 based on the identifier included in the response. Network actor 620 may identify itself in the request as a second source address. As discussed above in regard to FIG. 4, where the network actor makes use of an intermediary such as a split tunnel VPN, the network actor may utilize the VPN for only a portion of outbound network traffic. If the content server is within a network segment handled by the VPN, requests sent to the content server from the network actor may have a first source address associated with an endpoint of the VPN. If the network-segment identification server is located outside the network segment handled by the VPN, requests for the network-segment identification resource may be made using a second source address, the real address of the network actor. Thus, in some embodiments the network actor may be directed to reveal its real IP address as a result of accessing a network-segment identification resource outside the address space handled by the VPN (or other intermediary). In step 610, network-segment identification server 640 may optionally record the second source address and the identifier in an access log. Additionally and/or alternatively, network-segment identification server 640 may generate a notification and/or event that the identifier was used by the second source address.

At step 612, content server 630 or an associated computing device may request, for example, access logs from network-segment identification server 640 or other information associated with the identifier. At step 614, network-segment identification server 640 may provide a notification to content server 630 of the source address used to access a network-segment identification resource stored on network-segment identification server 640. The notification may be generated based on and/or include any of the identifier, session information, device IDs, user names, access date or time, and the like. In some embodiments, network-segment identification server 640 may send the access record without a request from content server 630. That is, in some embodiments step 614 may occur independent of step 612 and/or step 612 may be optional.

In step 616, content server 630 or an associated computing device may compare the second source address to the first source address and determine if an access pattern of the network actor suggest use of an intermediary, such as VPN and/or proxy usage. If the source addresses are not the same, the content server may determine that network traffic to the content server and/or network-segment identification server is being routed or sent through a VPN, proxy server, and/or other intermediary.

As a result of the method and system architecture illustrated in FIG. 5, 6, and other figures, and according to some embodiments, a content server or associated computing devices managing the content server may be able to determine whether a network actor appears to be using a VPN, proxy server and/or other intermediary by observing whether the network actor uses a different source address to access a network-segment identification server in another region. If the network actor uses a different source address in requesting the network-segment identification resource, the content server may be able to detect that a different address was used based on an identifier used by the network actor in requesting the network-segment identification resource. According to some aspects, the content server may be able to assess network intermediary use by causing the network actor to reveal its network configuration based on retrieving information outside the range of IP address blocks handled by a VPN and/or proxy server.

Figure 8:
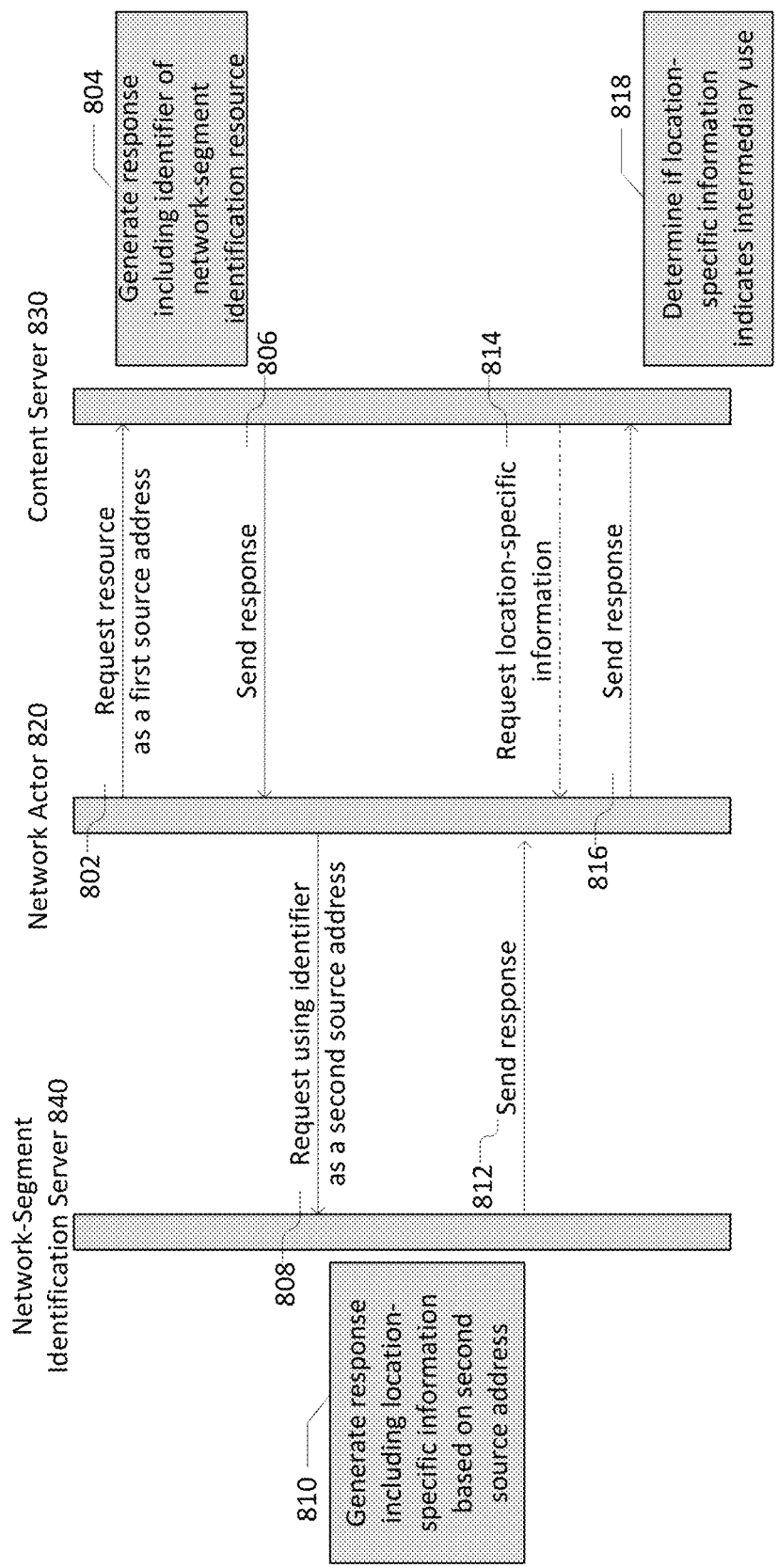
FIG. 8 illustrates another example process flow for implementing various features described herein.

FIGS. 5 and 6 illustrate one method and system for determining whether a network actor may be using an intermediary such as a VPN and/or proxy server. Another method and system for determining whether a network actor may be using an intermediary such as a VPN and/or proxy server is illustrated in FIGS. 7 and 8.

FIG. 7 illustrates an example method of determining whether a network actor may be using an intermediary such as a VPN and/or proxy server by challenging the network actor to retrieve and report location-specific information, according to some embodiments. The method of FIG. 7 may be implemented in one or more computing devices, such as computing device 200 (FIG. 2). The method may be implemented by a processor of the one or more computing devices, and executable instructions according to the method may be stored on a memory of the one or more computing devices. The one or more computing devices may be part of a network, such as network 109 (FIG. 1). The method may be implemented by a content server, such as content server 420 of FIG. 4, or may be implemented by a system comprising one or more computing devices for managing and/or assisting the content server. The process may be implemented in a network environment having devices such as servers 430 and 440, a network actor such as a user's consumption or access device (e.g., display device 112, gateway 111, personal computer 114, wireless device 116, etc.), or any other desired computing devices. The one or more computing devices may receive requests and send responses over the network. In one embodiment, the method may be implemented by a content server operated by a web content provider. The method of FIG. 7 may take place in an environment similar to that described above in regard to FIG. 5.

In step 702, a computing device, such as a content server, may receive a request for a content resource from a first source address. The request may be generated by and associated with a network actor, such as network actor 400 of FIG. 4. The request may include an indication of a first source address associated with the network actor. For example, data packets used to transmit the request may have an assigned source address value that the content server may observe. As in the method of FIG. 5, the computing device may perform an optional step of analyzing the first source address using one or more business rules based on a location and/or network segment associated with the first source address before proceeding to step 704. If the computing device determines that the network actor should not be granted access to the content, or some other appropriate action be taken based on the location or network segment associated with the first address, the computing device may halt execution of the method and take the appropriate action. For example, if the first source address indicates that the user should be blocked from accessing the content, the computing device may return an error message to the user rather than continue on to step 704. In some embodiments, the computing device may take further action before continuing to step 704 based on a location and/or network segment associated with the first source address. If the computing device determines that the network actor is allowed to access the content, the computing device may proceed to step 704 to determine whether the network actor appears to be using an intermediary such as a VPN or proxy server. However, in other embodiments, this optional step is omitted and the computing device may proceed from receiving the source request in step 702 to generating a response to the request in step 704 as discussed further below.

In step 704, the content server may generate a response to the request. Optionally, step 704 need not be performed in response to the request received in step 702, but rather as an initial step to, e.g., proactively determine information related to the identity of a network actor. The response may include the requested content resource in a form suitable for presentation to or at the network actor, as discussed above in regard to FIG. 5. In generating the response, the content server may include an identifier of a network-segment identification resource. The network-segment identification resource may, in some embodiments, be a resource available at a location other than the content server, such as at a network-segment identification server. The network-segment identification resource may be any resource available on the network and accessible by the network actor. The network-segment identification server may be located in a different network segment and/or IP address block from the content server. For example, in the networking environment illustrated in FIG. 4, the network-segment identification resource may be an electronic resource available at server 430 and/or server 440.

The content server may include in a response one or more identifiers of one or more network-segment identification resources, and each may be available from different servers. In some embodiments, the network-segment identification resource may be content for inclusion in a webpage or other response provided by the content server. For example, the network-segment identification resource may be an image provided by a network-segment identification server other than the content server. The network-segment identification resource may be an image, text portion, markup document, script, video file, audio file, applet, document, and/or any other content suitable for inclusion in a presentation of the response from the content server.

The identifier of the network-segment identification resource may be a URL/URI inserted into the response as a pointer the network-segment identification resource on the network. The identifier may be used by the network actor to access and/or retrieve the network-segment identification resource, such as through an HTTP request similar to that used by the network actor to request the electronic resource from the content server.

The network-segment identification resource may be stored on a network-segment identification server configured to vary a response to a request for the network-segment identification resource based on determining a location and/or network segment associated with a network actor requesting the network-segment identification resource. The network-segment identification server may determine a location and/or network segment associated with a request for the network-segment identification resource based on a source address included in the request, much like the content server does in response to the initial request for the electronic resource as discussed above. The network-segment identification server can vary any part of its response to the request based on the determined location and/or network segment, thereby generating location-specific information. For example, the network-segment identification server may select content to return to the network actor based on the location, such as returning an image of the flag of a country corresponding to the location. As another example, the network-segment identification server may select content seemingly unrelated to the location, such as returning a blue square to a US network actor or a red triangle to a UK network actor. As yet another example, the network-segment identification server may vary its response based on the network segment such as by providing a blue square to IP addresses 10.1.x.x and a red circle to IP addresses 10.255.x.x. In some embodiments, the network-segment identification server may vary its response in more subtle ways. For example, the network-segment identification server may send an image with a 64×64 resolution to US network actors but send an image with 128×128 resolution to UK network actors. As another example, the network-segment identification server could change the color of a single pixel based on the determined location of the network actor. In still other embodiments, the network-segment identification server may encode the source address used to access the network-segment identification resource into the response. Some attributes that may be varied based on the location of the network actor include resolution, color depth, image content, pixel values, file size, file type, encoded values, patterns, and the like.

In step 706, the content server may send the response with the included identifier to the network actor in response to the request. The response may be sent back to the first source address indicated in the request. Where the network actor is using a VPN (or other intermediary) to access the content server, the first source address may be the IP address of the VPN endpoint and the response may be sent to the VPN endpoint. The VPN endpoint may cause the response to be sent to the network actor. The network actor may use other intermediaries in addition to or in lieu of the VPN, such as a proxy server, to change an apparent first source IP address.

The network actor may process and/or render the electronic resource as returned in the response. The response may direct the network actor to, knowingly or unknowingly, retrieve the network-segment identification resource using the identifier. For example, the identifier could be included in the response as a source for an HTML <img> tag, and a browser provided on the network actor would retrieve the network-segment identification resource to properly display the page. As noted above, images are but one on example of network-segment identification resources and any suitable resources could be utilized, such as images, files, videos, audio, scripts, and the like.

In step 708, the content server and/or associated computing device may receive information associated with the network-segment identification resource, such as location-specific information, from the network actor associated with the first source address. The information, such as the location-specific information, may be received in response to an active request by the content server or based on information that the content server sent to the network actor in response to the original request for the electronic resource. For example, the content server may include script, markup, and/or other instructions in the response generated in step 704 that instruct the network actor to retrieve the network-segment identification resource and return information about the network-segment identification resource to the content server. The instructions may cause the network actor to return information about attributes of the network-segment identification resource as received by the network actor. As an example, the content server may instruct the network actor to indicate a resolution of the retrieved network-segment identification resource. Any attribute of the network-segment identification resource may be returned by the network actor based on the instructions, including resolution, color depth, image content, pixel values, file size, file type, encoded values, patterns, and the like.

As noted above, the network-segment identification server, or any computing device having similar functionality, may vary its response to a request for the network-segment identification resource based on a location and/or network segment associated with a source address of the request. Thus, the network-segment identification resource as received by the network actor may be utilized to determine a location, network segment, and/or source address that the network actor identified in a request to the network-segment identification server.

In step 710, the content server (or associated computing device) may compare the location-specific information returned from the network actor to an expected result based on the source address indicated by the network actor in the original request for the electronic resource (from step 702). In some embodiments, the content server may query the network-segment identification server to identify an expected result using the first source address. Additionally and/or alternatively, the content server may maintain a table recording expected results for various IP address blocks. Based on whether the location-specific information matches the expected result, the content server may determine whether the network actor's behavior suggests that the network actor may be using an intermediary such as a VPN and/or proxy server for some of his network communications. If the location-specific information does not match the expected result, the content server may determine that a different source address was used to access the network-segment identification server and the network actor may be using a VPN, proxy server, and/or other intermediary. In some embodiments, the content server may delay determining whether the received location-specific information matches the expected result until another request is received by the content server from the same network actor, as discussed above in regard to FIG. 5. Similarly to that described above in regard to FIG. 5, the content server may employ a scoring function based on one or more observed attributes of the source address used in the original request and one or more attributes implied by the location-specific information.

Based on determining that the network actor may be using an intermediary such as a VPN and/or proxy server, the content server can take any appropriate action, such as those discussed above in regard to FIG. 5. For example, in some embodiments the content server may block access by users determined to be using VPNs and/or other intermediaries. In some embodiments, the content server may use the location indicated by the location-specific information (based on knowledge about how the network-segment identification server varies its response) as primary or additional input into various geoidentification content rules. For example, the content server may decide to block access by the user based on the location used to access the network-segment identification resource.

As noted above in regard to FIG. 5, in some embodiments the response may include more than one network-segment identification resource. Using more than one network-segment identification resource may allow the content server or managing system to more accurately identify whether the network actor is using a VPN (or other intermediary) and further identify a likely real address of the network actor. The content server may compare the location-specific information returned from each network-segment identification server identified in the response to expected results based on the source address of the original request. Based on this comparison and the known expected responses of each network-segment identification server, the content server may determine whether the network actor is using a VPN and which location may be more likely to be associated with a real address of the network actor. For example, if the location-specific information returned from a first and second network-segment identification server indicates one location and/or network segment, and the source address used in the original request indicates another, the content server may determine that the location used to access the network-segment identification resources corresponds to a real address of the network actor.

Where multiple identifiers associated with multiple network-segment identification resources are included in the response to the request for the electronic resource, the content server may determine a probable real location associated with the network actor and base network-segment identification decisions on the probable real location. For example, if a first location is indicated by a first source address used to access a content server in the UK, but a second location is indicated by location-specific information retrieved from network-segment identification servers in the US and Brazil, the content server may determine that the second location is associated with probable real address of the network actor and base geoidentification techniques on the second location. As a result, the content server may provide the network actor with appropriate content based on the probable location of the network actor.

In some embodiments, the content server and/or managing system may store records of the first and second source address pairs, and these records may be analyzed to detect patterns and trends, as discussed above in regard to FIG. 5. The content server may observe that a first source address used in multiple requests provides differing location-specific information from a particular network-segment identification server. For example, the content server could receive a first request from a first source address and detect a second location is used to access a network-segment identification resource stored on a network-segment identification server. The content server could later receive a second request from the first source address and detect a third location used to access the network-segment identification resource on the same network-segment identification server. In such a scenario, the content server may determine that the first source address is associated with more than one network actor and may be a VPN endpoint (or other intermediary device). Additional criteria may be used to better and/or more accurately determine addresses associated with VPN endpoints, such as waiting until a threshold number of different actors have used a first source address before determining it to be a VPN endpoint.

FIG. 8 illustrates an example process flow that corresponds to various methods enabled by the disclosure, such as the method illustrated in FIG. 7. A system may include network actor 820, content server 830, and network-segment identification server 840, each of which may be implemented by one or more computing devices in communication over a network. At step 802, network actor 820 may request a content resource from content server 830 and identify itself as a first source address.

At step 804, content server 830, or an associated computing device as part of a system for managing content server 630, may generate a response to the request including an identifier of a network-segment identification resource. In step 806, content server 830 may send the response to network actor 820.

At step 808, network actor 820 may request a network-segment identification resource from network-segment identification server 840 based on the identifier included in the response. Network actor 820 may identify itself in the request as a second source address. The second source address may be different from the first source address, for example, where the network actor makes use of an intermediary such as a split tunnel VPN as described above in regard to FIGS. 5 and 6. In step 810, network-segment identification server 840 may generate a response to the request including location-specific information based on the second source address. Network-segment identification server 840 may be configured to vary a response to a request for the network-segment identification resource based on determining a location of a network actor requesting the network-segment identification resource. The network-segment identification server can vary any part of its response to the request based on the determined location including content selection, resolution, color depth, image content, pixel values, file size, file type, encoded values, patterns, and the like, for example.

At step 812, network-segment identification server 840 may send the response including the location-specific information to network actor 820. At step 814, content server 830 (or an associated computing device) may request the location-specific information from network actor 820. In some embodiments, step 814 may be omitted, such as where the response returned in step 806 includes instructions to retrieve and return the location-specific information. In step 816, network actor 820 may return the location-specific information to content server 830.

In step 818, content server 830 may compare the location-specific information to an expected result. The expected result may be determined based on the first source address that was used to access the electronic resource in step 802. If the location-specific information does not match the expected result, content server 830 may determine that a different source address was used to access network-segment identification server 840. As a result, the content server may determine that network traffic to the content server and/or network-segment identification server is being routed or sent through an intermediary such as a VPN and/or proxy server.

As a result of the method and system illustrated in FIGS. 7 and 8, and in some embodiments, a content server or system managing a content server may be able to determine whether a network actor appears to be using an intermediary such as a VPN and/or proxy server by challenging the network actor to retrieve information from another region. If the network actor uses a different source address in requesting the network-segment identification resource, the content server may be able to detect that a different address was used based on the challenge information. According to some aspects, the content server may be able to assess VPN use (or use of another intermediary) without needing to query other servers for access logs or receive notifications from the other servers. Instead, the content server may be able to cause the network actor to reveal its network configuration based on retrieving information outside the range of IP address blocks handled by a VPN and/or proxy server.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:

1. A system comprising:
a first server configured to:
receive a first request from a first source address for a content resource;
provide a response to the first request, wherein the response comprises an identifier of a network-segment identification resource and is configured to cause a computing device associated with the first source address to access the network-segment identification resource using the identifier;
detect a second request for the network-segment identification resource based on the identifier, wherein the second request is associated with a second source address;
receive, from a second server associated with the network-segment identification resource, information indicating one or more attributes of the second request; and
identify the computing device associated with the first source address as being associated with an intermediary based on a result of comparing one or more attributes of the first request to the one or more attributes of the second request; and
the second server, configured to:
receive the second request from the second source address; and
provide, to the first server, the information indicating the one or more attributes of the second request.

2. The system of claim 1, wherein the first server is configured to identify the computing device as associated with virtual private network (VPN) use or proxy server use.

3. The system of claim 1, wherein the first server is further configured to:
select the identifier from a pool of predetermined identifiers, wherein the selected identifier is assigned to be associated with the first request.

4. The system of claim 1, wherein the first server is further configured to:
generate the identifier based on the first source address, wherein the identifier comprises a parameter generated based on the first source address.

5. The system of claim 1, wherein the network-segment identification resource comprises an image resource and the response to the first request comprises instructions operable to cause the computing device to retrieve the image resource using the identifier.

6. The system of claim 1, wherein the first server is configured to identify the computing device as associated with the intermediary based on determining that the first source address does not match the second source address.

7. The system of claim 1, wherein the first server is configured to query the second server to request the information indicating the one or more attributes of the second request.

8. The system of claim 1, wherein the first server is configured to detect the second request based on receiving notification of the second request from the server, and wherein the second server is further configured to notify the first server of the second request.

9. The system of claim 1, wherein the first server is further configured to:
block access by the computing device to the content resource or related resources responsive to identifying the computing device as associated with the intermediary.

10. The system of claim 1, wherein the first server is configured to identify the computing device as associated with the intermediary based on determining a network distance between the first source address and the second source address.

11. An apparatus comprising:
    at least one processor; and
    memory storing instructions that, when executed by the at least one processor, cause the apparatus to:
        receive a first request from a first source address for a content resource;
        provide a response to the first request, wherein the response comprises an identifier of a network-segment identification resource and is configured to cause a computing device associated with the first source address to access the network-segment identification resource using the identifier;
        detect a second request for the network-segment identification resource based on the identifier, wherein the second request is associated with a second source address;
        receive, from a server associated with the network-segment identification resource, information indicating one or more attributes of the second request; and
        identify the computing device associated with the first source address as being associated with an intermediary based on a result of comparing one or more attributes of the first request to the one or more attributes of the second request.

12. The apparatus of claim 11, wherein the instructions, when executed by the at least one processor, cause the apparatus to identify the computing device as associated with the intermediary by causing the apparatus to identify the computing device as associated with virtual private network (VPN) use or proxy server use.

13. The apparatus of claim 11, wherein the instructions, when executed by the at least one processor, further cause the apparatus to:
    generate the identifier based on the first source address, wherein the identifier comprises a parameter generated based on the first source address.

14. The apparatus of claim 11, wherein the instructions, when executed by the at least one processor, cause the apparatus to identify the computing device as associated with the intermediary based on determining that the first source address does not match the second source address.

15. The apparatus of claim 11, wherein the instructions, when executed by the at least one processor, cause the apparatus to query the server to request the information indicating the one or more attributes of the second request.

16. The apparatus of claim 11, wherein the instructions, when executed by the at least one processor, cause the apparatus to detect the second request based on receiving notification of the second request from the server.

17. The apparatus of claim 11, wherein the instructions, when executed by the at least one processor, further cause the apparatus to:
    block access by the computing device to the content resource or related resources responsive to identifying the computing device as associated with the intermediary.

18. At least one non-transitory computer-readable medium storing instructions that, when executed by at least one processor, cause the at least one processor to perform steps comprising:
    receiving, by a first server, a first request from a first source address for a content resource;
    providing a response to the first request, wherein the response comprises an identifier of a network-segment identification resource and is configured to cause a computing device associated with the first source address to access the network-segment identification resource using the identifier;
    detecting a second request for the network-segment identification resource based on the identifier, wherein the second request is associated with a second source address;
    receiving, by the first server and from a second server associated with the network-segment identification resource, information indicating one or more attributes of the second request; and
    identifying the computing device associated with the first source address as being associated with an intermediary based on a result of comparing one or more attributes of the first request to the one or more attributes of the second request.

19. An apparatus comprising:
    at least one processor; and
    memory storing instructions that, when executed by the at least one processor, cause the apparatus to:
        receive a first request from a first source address for a content resource;
        provide a response to the first request, wherein the response comprises instructions configured to cause a computing device associated with the first source address to access a network-segment identification resource and retrieve first location-specific information;
        receive, from the first source address, the first location-specific information associated with the network-segment identification resource;
        determine expected location-specific information based on the first source address; and
        identify the first source address as being associated with an intermediary based on determining that the received first location-specific information does not match the expected location-specific information.

20. The apparatus of claim 19, wherein the instructions, when executed by the at least one processor, cause the apparatus to identify the first source address as associated with the intermediary by causing the apparatus to identify the computing device as associated with virtual private network (VPN) use or proxy server use.

21. The apparatus of claim 19, wherein the received first location-specific information is based on a second source address used to access the network-segment identification resource.

22. The apparatus of claim 19, wherein the network-segment identification resource is located in a different internet protocol (IP) address block from the content resource.

23. The apparatus of claim 19, wherein the instructions, when executed by the at least one processor, further cause the apparatus to:
    determine a location based on the first location-specific information; and
    select content to provide to the first source address based on the determined location.

24. The apparatus of claim 23, wherein selecting content based on the determined location comprises selecting a content language based on the determined location.

25. At least one non-transitory computer-readable medium storing instructions that, when executed by at least one processor, cause the at least one processor to perform steps comprising:

receiving, by a first server, a first request from a first source address for a content resource;

providing a response to the first request, wherein the response comprises instructions configured to cause a computing device associated with the first source address to access a network-segment identification resource and retrieve first location-specific information;

receiving, from the first source address, the first location-specific information associated with the network-segment identification resource;

determining expected location-specific information based on the first source address; and identifying the first source address as being associated with an intermediary based on determining that the received first location-specific information does not match the expected location-specific information.

\* \* \* \* \*